(12) United States Patent
Takada

(10) Patent No.: US 6,212,887 B1
(45) Date of Patent: Apr. 10, 2001

(54) AXLE DRIVING APPARATUS

(75) Inventor: Kenichi Takada, Amagasaki (JP)

(73) Assignee: Kanzaki Kokyukoki Mfg. Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/259,267

(22) Filed: Mar. 1, 1999

(30) Foreign Application Priority Data

Mar. 24, 1998 (JP) .................................................. 10-076138

(51) Int. Cl.$^7$ .................................................. B60K 12/00
(52) U.S. Cl. .................................................. 60/453
(58) Field of Search .............................. 60/453, 454, 464

(56) References Cited

U.S. PATENT DOCUMENTS

| | | | |
|---|---|---|---|
| 2,961,829 | * | 11/1960 | Weisenbach .......................... 60/464 |
| 3,166,905 | * | 1/1965 | Budzich et al. ....................... 60/464 |
| 3,208,222 | * | 9/1965 | Wilmes .............................. 60/464 X |
| 4,348,864 | * | 9/1982 | Ichimura et al. ...................... 60/454 |
| 5,038,634 | * | 8/1991 | Masuto et al. ..................... 92/12.2 X |
| 5,259,193 | * | 11/1993 | Maesaka et al. ....................... 60/453 |
| 5,277,270 | * | 1/1994 | Hasegawa ........................... 180/378 |
| 5,311,740 | * | 5/1994 | Shiba et al. ........................... 60/453 |
| 5,493,860 | * | 2/1996 | Bjerke et al. ...................... 60/454 X |
| 5,542,307 | * | 8/1996 | Hasegawa et al. .................. 74/15.63 |
| 5,628,189 | * | 5/1997 | Hauser et al. .......................... 60/454 |
| 5,809,845 | * | 8/1998 | Shimizu ............................ 60/454 X |
| 5,819,535 | * | 10/1998 | Smothers et al. ....................... 60/454 |

FOREIGN PATENT DOCUMENTS

| | | |
|---|---|---|
| 6-61555 | 8/1994 | (JP) . |
| 6-84061 | 12/1994 | (JP) . |
| 7-63157 | 3/1995 | (JP) . |

* cited by examiner

Primary Examiner—John E. Ryznic
(74) Attorney, Agent, or Firm—Sterne, Kessler, Goldstein, & Fox P.L.L.C.

(57) ABSTRACT

An axle driving apparatus, wherein at the interior of a housing is formed an internal fluid sump, and are disposed a fluid circuit, which fluidly connects a hydraulic pump with a hydraulic motor so as to constitute a hydrostatic stepless transmission, and a fluid feeding port, which is opened toward the fluid circuit when the fluid pressure within the fluid circuit becomes negative; at the exterior of the housing is formed an external fluid sump, which is provided with a fluid inlet port, a fluid outlet port and a filter element interposed between the both of ports; a fluid extracting means communicates the internal fluid sump with the fluid inlet port, and a fluid introducing means communicates the fluid outlet port with the fluid feeding port.

30 Claims, 6 Drawing Sheets

AXLE DRIVING APPARATUS

BACKGROUND OF THE INVENTION

1. Field of the Invention

The present invention relates to an axle driving apparatus comprising a housing, a hydrostatic stepless transmission and an oil filtrating means for filtrating oil fed into the transmission, wherein a hydraulic pump, a hydraulic motor and a center section forming a fluid circuit fluidly connecting the pump and motor constituting the transmission are disposed together in the housing and the oil filtrating means is disposed out of the housing 2. Related Art Japanese Laid Open Gazettes Nos. Hei 6-84,061, Hei 6-61,555 and Hei 7-63,157 disclose well-known conventional arrangements of oil filtrating means provided on or in such an axle driving apparatus that axles, a hydraulic pump driven by power from an engine and a hydraulic motor driven by oil discharged from the pump for driving the axles are contained in a housing; the pump and motor being fluidly connected with each other through a pair of oil passages within a center section so as to constitute a hydrostatic stepless transmission.

There are important points for providing a hydrostatic stepless transmissional axle driving apparatus with an oil filtrating means for filtrating operating oil for the transmission thereof in that the oil filtrating means should be disposed so as to be easily detachable, preferably without soiling a user's hand because it requires frequent maintenance or exchange and that means for communicating the pair of oil passages within the center section fluidly connecting the hydaulic pump and motor should be provided.

The most suitable manner for enabling the maintenance and exchange of a filter element to be easily done without soiling a hand is the disposal of an oil filter containing a filter element on the exterior of the housing, as disclosed in Hei 6-84,061. The oil filter is provided therein with an oil suction port, an oil discharge port and a filter element interposed between both the ports.

However, referring to the axle driving apparatus disclosed in this cited art, the center section is not soaked in the oil sump in the housing but fixed on one opening end of the housing, so that the hydraulic pump and motor are attached to the inner surface of the center section facing the interior of the housing. The both ports of the oil filter is connected with oil passages bored in the wall of the housing respectively, so that the oil suction port is in communication with an oil sump in a housing serving as an oil source, and the oil discharge port is in communication with the pair of oil passages constituting the fluid circuit of the hydrostatic transmission. In this relation, an oil communicating portion between the oil sump in the housing and the oil suction port of the oil filter and an oil splitting portion between the oil discharge port of the oil filter and the pair of oil passages of the center section must be formed within the wall of the housing or the center section, thereby complicating the processing of the housing or the center section.

Furthermore, such a construction that the center section is disposed out of the housing probably causes the oil leaking between the housing and the center section. The center section of each of the axle driving apparatuses disclosed in Hei 6-61,555 and Hei 7-63,157 is contained in a housing, thereby solving this problem.

However, the center section contained in the housing is soaked in the oil sump therein, so that if the oil filter of the above type is attached on the exterior of the housing, the both ports of the oil filter is spaced from the center section through the oil sump. Then, the oil filtrating means in each of Hei 6-61,555 and Hei 7-63,157 is disposed in the housing in the condition of being soaked in the oil sump, the outlet portions thereof in communication with the oil passages of the center section.

Referring to Hei 6-61,555, the filtrating means is directly attached to the lower surface of the center section. The housing is open at the bottom thereof and an oil pan casing is attached to the opening bottom. The filtrating means is disposed in the oil pan casing. In this construction, the center section forms a communicating passage toward the oil filtrating means in the bottom portion thereof. For maintenance or exchange of the oil filtrating means, the oil pan casing must be detached.

The cylindrical shaped oil filtrating means disclosed in Hei 7-63,157, is substantially horizontally extended between the side portion of the housing and the center section through the oil sump in the housing. The outer end of the oil filtrating means is inserted in an opening of the housing and a lid is pushed into the opening from outside of the housing against the outer end of the oil filtrating means, so that, when the lid is pulled out, the means can be pulled out from the interior of the housing.

These oil filtrating means are soaked in the oil sump in the housings, thereby compelling a user to have his/her hand soiled while detaching the means. The former cited axle driving apparatus requires the complicated removal of bolts from the oil pan casing for detaching the means. Also, a vehicle provided with this apparatus hits at the downward extending oil pan portion thereof against an obstacle on the ground with rather high possibility. It is hopeful for an axle driving apparatus to be constructed without such a downward extending portion, so as to provide a vehicle with a large ground clearance as much as possible. The latter cited axle driving apparatus which is provided with the oil filtrating means substantially horizontally disposed in the housing, can solve the problem, however, holds such another problem that, when a new replacing filtrating means is inserted into the housing, it is difficult to clear the position of the inner utmost end of the means with respect to the engaging portion of the center section.

As a result, an axle driving apparatus provided with a hydrostatic stepless transmission, whose center section is contained in a housing for prevention of oil leaking, prefers an oil filtrating means like the above mentioned oil filter disposed out of the housing so as to enable easy attachment and detachment thereof without soiling a user's hand. Furthermore, if the means is disposed on a lateral side of the housing, the apparatus can be vertically compact, thereby enabling a vehicle to have a large ground clearance. However, such an apparatus requires an oil splitting system where the oil discharged from the outlet port of the filtrating means disposed out of the housing is separated into the two flows toward the respective pair of oil passages of the center section disposed in the housing. If the oil splitting system is formed by the housing or the center section, they are complicated in its processing, thereby also becoming expensive. Furthermore, when a trouble is generated in the oil split system, the housing or the center section itself must be repaired or exchanged in the worst, thereby worsening maintenance. Hence, a detachable member having the oil split system, which is independent to the housing and the center section, is preferred. Conventionally, such a member has not been known.

SUMMARY OF THE INVENTION

The object of the present invention regarding to an axle driving apparatus having a hydrostatic stepless transmission including a center section disposed in a housing is to provide a means for making an oil filtrating means disposed at the exterior of the housing in communication with the center section disposed in the housing, thereby enabling an easily detachable oil filtrating means to be disposed at the exterior of the housing.

The axle driving apparatus according to the present invention is so constructed that a fluid circuit (a center section) fluidly connecting a hydraulic pump and a hydraulic motor; thereby constituting a hydrostatic stepless transmission; is disposed in a housing, an internal oil sump being formed at the interior of the housing and an external oil sump being disposed at the exterior of the housing. The external oil sump is provided with an oil inlet port, an oil outlet port and a filter element interposed between the both ports. In the housing are also disposed an oil feeding port, which is opened toward the fluid circuit when the oil pressure within the fluid circuit becomes negative, an oil extracting means provided with an oil passage between the internal oil sump and the oil inlet port and an oil introducing means provided with an oil passage between the oil outlet port and the oil feeding port.

The fluid circuit may consist of a pair of oil passage fluidly connecting the hydraulic pump and motor and the oil feeding port may consist of a pair of oil feeding ports connected with the respective pair of oil passages. In this construction, the oil passage of the oil introducing means is formed as to be split for connection with the respective pair of oil feeding ports.

The external oil sump may be formed in a single oil filter, for example, so as to be detachably attached onto the housing, and may be disposed on the outer surface or preferably-the outer side (vertical) surface of the housing.

The oil feeding port may be provided with a check valve which is opened when the oil pressure in the fluid circuit becomes negative.

The oil extracting means may be replaced with an oil passage formed within the wall of the housing so as to connect the internal oil sump with the oil inlet port.

The external oil sump may be disposed on the outer surface of the oil extracting means. In this construction, an outwardly opening hole may be formed in the wall of the housing so as to communicate with the internal oil sump and the oil introducing means may be interposed between the oil outlet port and the oil feeding port in the condition of passing through the hole and closing the outer opening end of the hole by the outer portion of the oil introducing means, and also may be provided with an oil extracting passage between the internal oil sump and the oil inlet port.

DETAILED DESCRIPTION OF THE PREFERRED EMBODIMENTS

Figure 1:
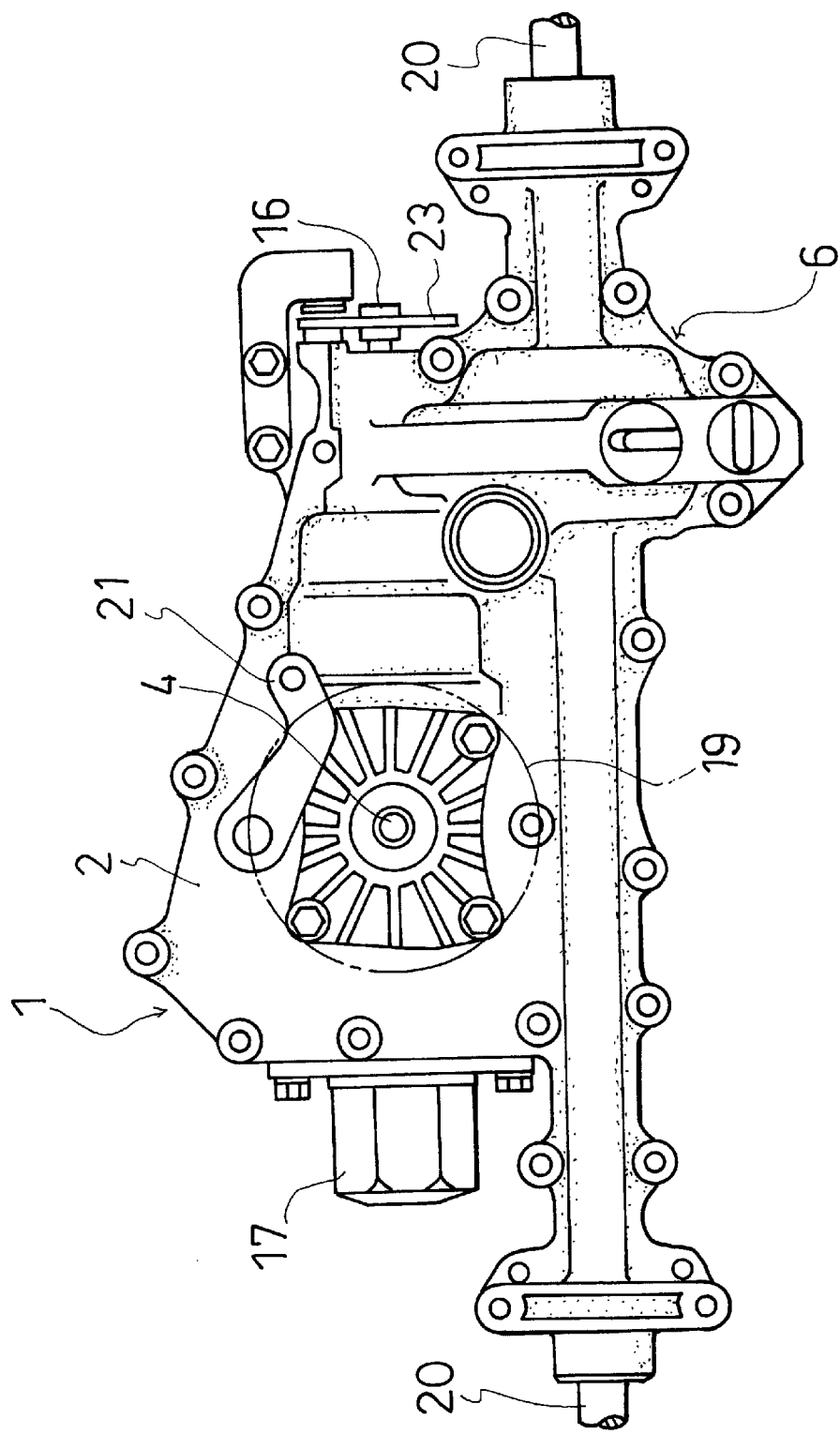
FIG. 1 is a plan view of an axle driving apparatus according to the present invention.
Figure 2:
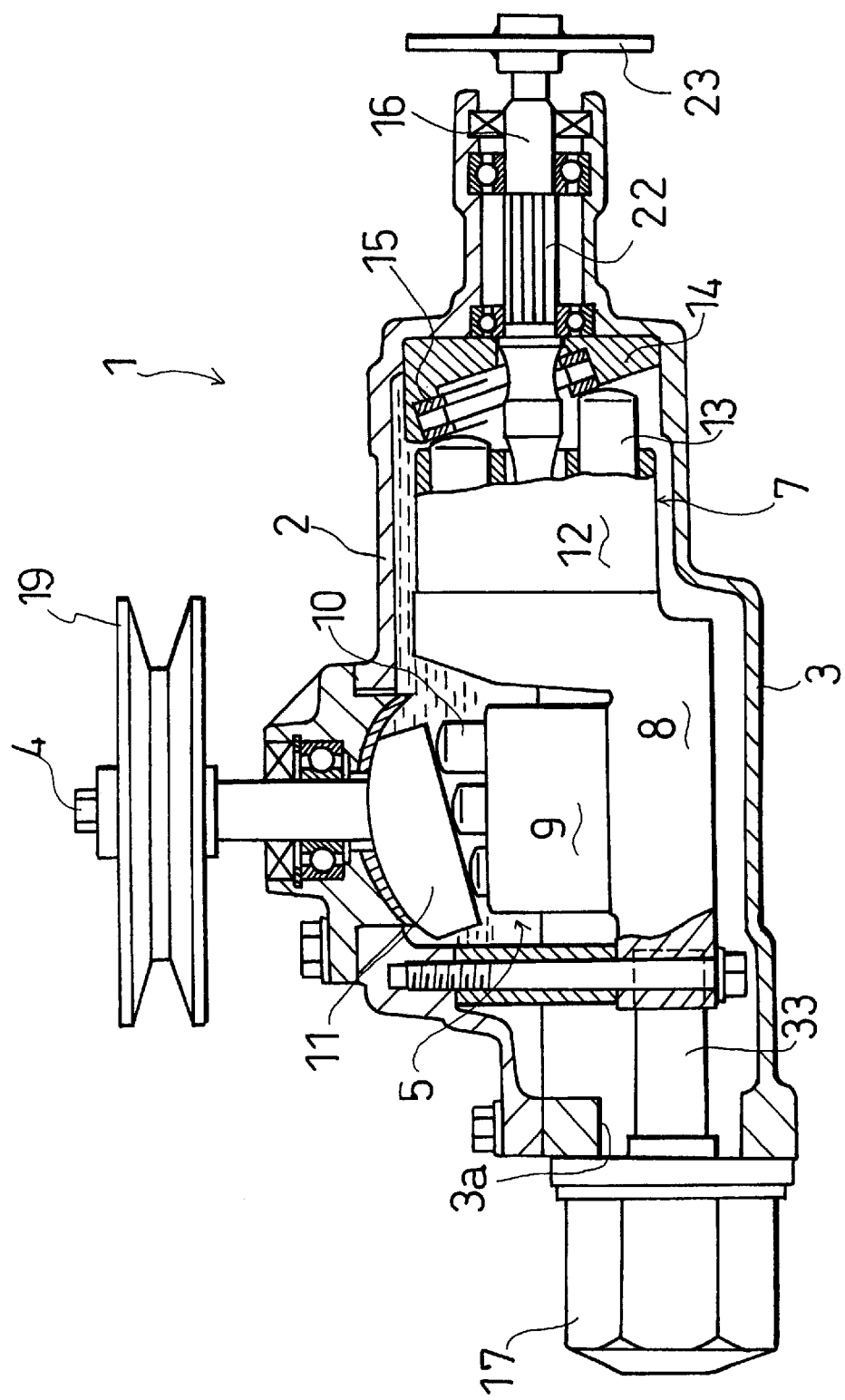
FIG. 2 is a sectional front view of the same.

As shown in FIGS. 1 and 2, an axle driving apparatus of the present invention is provided with a vertically split housing 1 consisting of an upper housing part 2 and a lower housing part 3 joined with each other. The interior of housing 1, which is almost full of oil, constitutes an internal oil sump. An input shaft 4 passes vertically through upper housing part 2 at the substantially longitudinal and lateral center thereof. An input pulley 19 is fixed onto the upper portion of input shaft 4, so as to enable a belt hung around it to transmit power from an engine to input shaft 4.

A hydrostatic stepless transmission consisting of a hydraulic pump 5, a hydraulic motor 7 and a center section 8 in a substantially L-like shape, when sectionally viewed in side, onto which hydraulic pump 5 and motor 7 are mounted, is contained in housing 1, thereby preventing housing 1 from oil leaking caused by that of the closed circuit of center section 8.

Referring to hydraulic pump 5, a cylinder block 9 is rotatably mounted onto a pump mounting surface formed by a horizontal upper surface of center section 8. A plurality of cylindrical holes are bored in cylinder block 9. Springs are inserted into the respective cylindrical holes and pistons 10 are slidably inserted through the springs into the cylindrical holes respectively. An intermediate portion of input shaft 4 is splined with an axial portion of cylinder block 9, so as to integrally rotate cylinder block 9 together with input shaft 4. A lower end of input shaft 4 is rotatably supported by center section 8.

Heads of pistons 10 are biased to abut against a movable swash plate 11. Swash plate 11 interlocks through a linkage (not shown) with a speed control arm 21 provided above upper housing part 2, so as to be slanted left and right at various angles by the rotation of speed control arm 21, thereby adjusting the direction and amount of pressure oil discharged from hydraulic pump 5.

Referring to hydraulic motor 7, a cylinder block 12 is rotatably mounted onto a vertical surface of center section 8. A plurality of cylindrical holes are also bored in cylinder block 12. Springs are inserted into the respective cylindrical holes and pistons 13 are slidably inserted through the springs into the cylindrical holes respectively. Heads of pistons 13 are biased to abut against a thrust bearing 15 of a fixed swash plate 14. Swash plate 14 is fixedly held by upper and lower housing parts 2 and 3 at their joint surfaces.

An output shaft 16 is inserted into an axial portion of cylinder block 12 so as to be rotatably supported one end thereof by center section 8. A gear 22 is formed on the periphery of the opposite side portion of output shaft 16 and a brake disk 23 is fixed onto the other end of the same. A plurality of speed reduction gears (not shown) are disposed so as to transmit power from gear 22 to a differential gear unit (not shown), thereby differentially transmitting power to left and right axles 20 laterally provided in housing 1.

Figure 3:
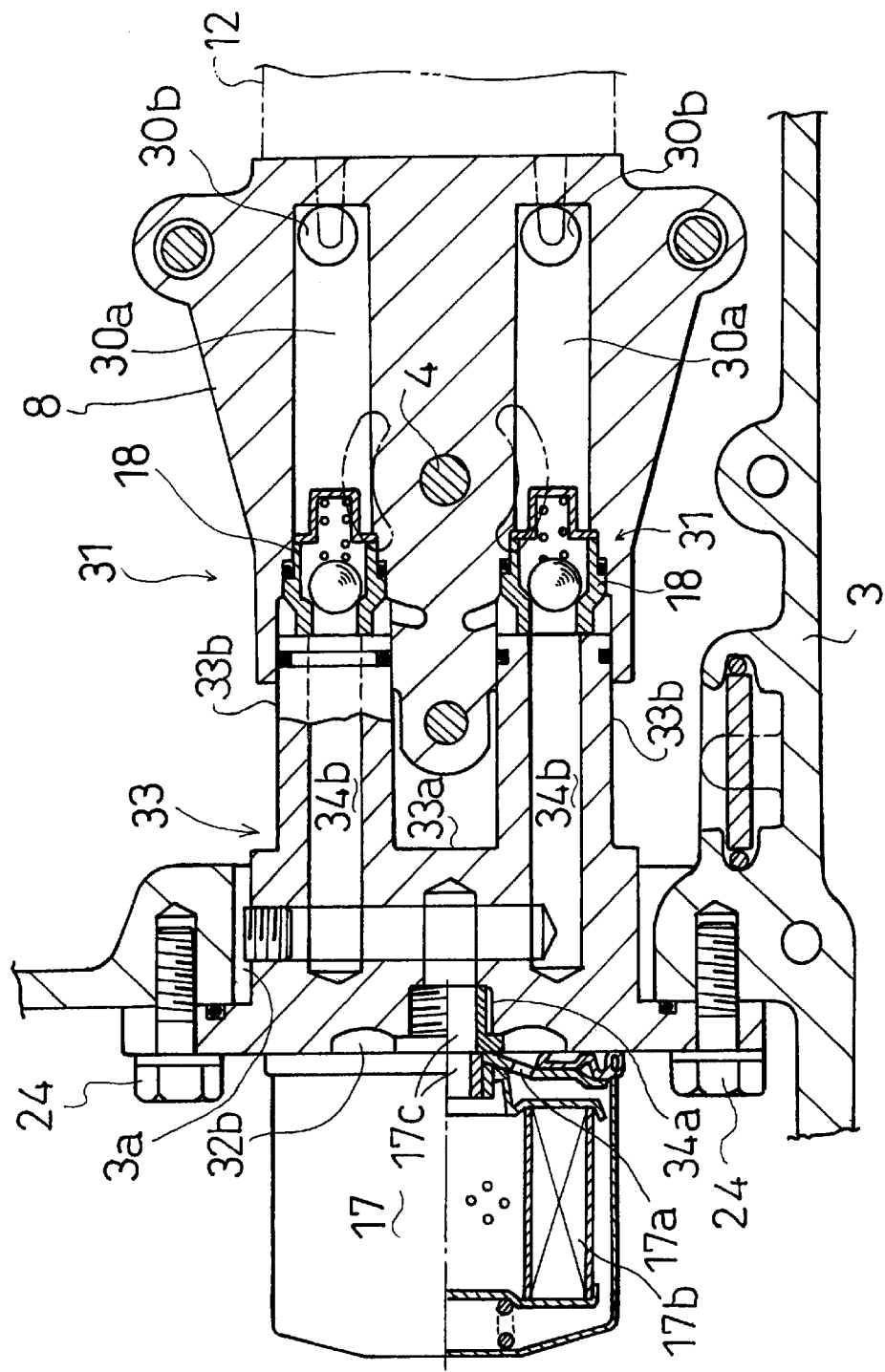
FIG. 3 is a fragmentary sectional plan view of the axle driving apparatus showing an area wherein an oil filter is disposed according to the present invention.
Figure 4:
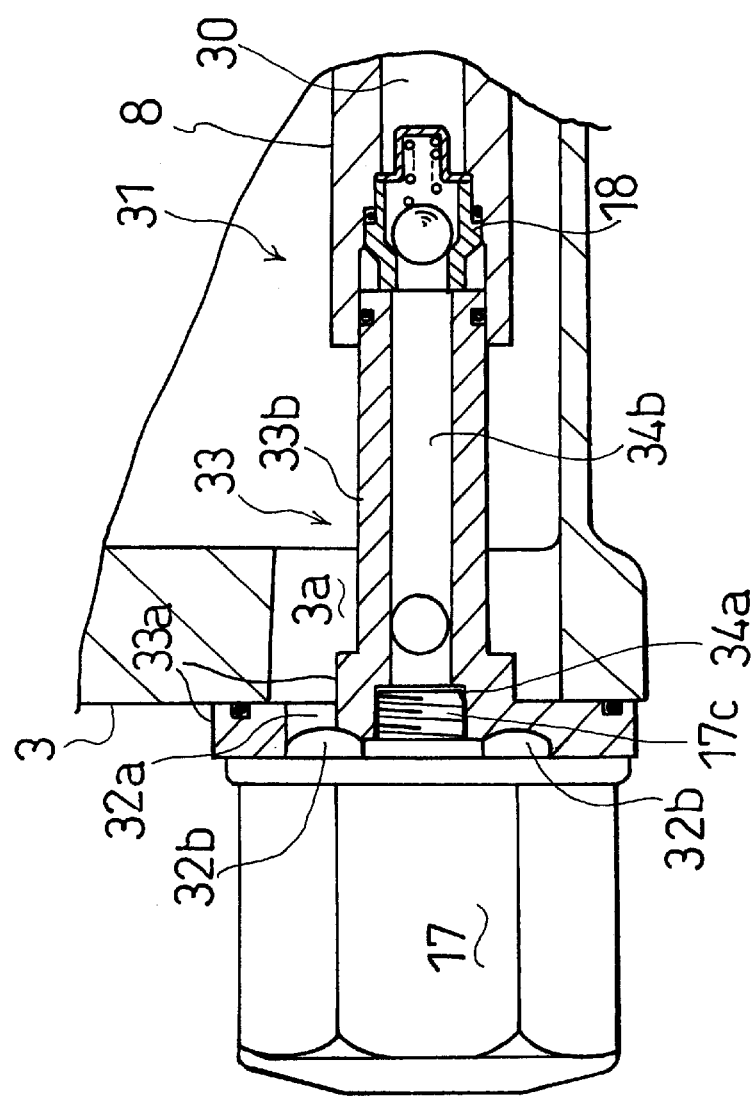
FIG. 4 is a sectional front view of the same.

As shown in FIGS. 3 and 4, a pair of parallel straight oil passages 30a are bored in a horizontally extending portion of center section 8. A pair of oil passages 30b in parallel with input shaft 4 are bored in a vertically extending portion of center section 8. Oil passages 30a communicate with respective oil passages 30b through the intersection of passages 30a and 30b, so that hydraulic pump 5 and hydraulic motor 7 are fluidly connected with each other through two series of oil passages 30a and 30b, thereby constituting a closed fluid circuit.

Opening ends of oil passages 30a serving as oil feeding ports 31 are provided therein with respective check valves 18 and are connected with a respective pair of split tube portions 33b formed by a detachable supporter 33 serving as an oil introducing means for introducing oil from an external oil sump formed in an oil filter 17 into the pair of oil passages 30a.

In this regard, an inserting hole 3a is bored through the side portion of lower housing part 3 facing a side surface of the horizontally extending portion of center section 8. Supporter 33 consisting of a basic portion 33a and the pair of parallel split tube portions 33b in perpendicular to basic portion 33a, thereby looking like an arch when viewed in plan, is inserted from outside to inside about lower housing part 3 through hole 3a, so that the utmost ends of split tube portions 33b are engaged into the respective opening ends of oil passages 30a provided therein with respective check valves 18, thereby holding check valves 18 in respective oil feeding ports 31 without slipping out therefrom. The outer end of basic portion 33a forms a flange so as to close the outer opening end of inserting hole 3a. The flange is clamped onto the outer side surface of lower housing part 3 by a plurality of bolts 24, thereby fixing supporter 33 to lower housing part 3.

Supporter 33 is provided therein with an oil introducing passage 34 consisting of a female screwed hole 34a and a pair-of split oil passages 34b. To be detailed, female screwed hole 34a is open at the center of the outer side surface of basic portion 33a and is joined with the pair of split oil passages 34b in basic portion 33a. Each split oil passage 34b passes axially through each split tube portion 33b and is open at the utmost end thereof, so as to communicate with each oil passage 30a through each check valve 18 in each oil feeding port 31.

Accordingly, an oil splitting portion for separating oil fed into the respective pair of oil passages 30a of center section 8 is formed in supporter 33 which is independent to housing 1 (upper and lower housing parts 2 and 3) and center section S.

Moreover, supporter 33 is also provided with an oil extracting passage 32 consisting of an oil hole 32a and an oil chamber 32b. Ring-shaped oil chamber 32b is recessed at the outer surface of basic portion 33a so as to surround female screwed hole 34a. Oil hole 32a is bored through basic portion 33a so as to be joined with a portion of oil chamber 32b and be open toward inserting hole 3a spacing from supporter 33 passing there through in the bottom portion of the internal oil sump. Hence, lower housing part 3 having inserting hole 3a and supporter 33 having oil extracting passage 32 constitute an oil extracting means, which extracts oil from the internal oil sump in housing 1 to the external oil sump in oil filter 17.

Referring to the construction and disposal of oil filter 17, the interior of oil filter 17 serving as the external oil sump is provided with an axial oil discharge (outlet) port 17c, an oil suction (inlet) port 17a surrounding oil discharge port 17c and a filter element 17b interposed between both ports 17a and 17c. Oil discharge port 17c projects outwardly so as to form a tubal male screwed portion, so that oil filter 17 is fixed onto the outer side surface of supporter 33 by screwing the male screwed portion thereof into female screwed hole 34a. For maintenance or exchange of oil filter 17, it can be removed from supporter 33 easily just by outwardly screwing it so as to remove the male screwed tube portion of oil discharge port 17c out from female screwed hole 34a.

The interior of female screwed hole 34a is separated from oil chamber 32b by the male screwed tube portion of oil discharge port 17c engaged therein, thereby preventing the oil in oil extracting passage 32 and the oil in oil introducing passage 34 from being mixed. Thus, the oil extracting passage from the internal oil sump in housing 1 to oil suction port 17a and the oil introducing passage from oil discharge port 17c to both oil feeding ports 31 are defined, so that the operating oil also used as lubricating oil in the internal oil sump of housing 1 is sucked into oil suction port 17a of oil filter 7 through inserting hole 3a, oil hole 32a and oil chamber 32b, filtrated by filter element 17b, and discharged from oil discharge port 17c into both split oil passages 34b while being divided. Then, if the oil pressure within the closed fluid circuit becomes negative, either or both of check valves 18 are automatically opened so that the oil in either or both of oil passages 34b flows into respective oil passages 30a connecting thereto through opening check valve (valves) 18. Due to such oil feeding construction, another pump for feeding operating oil is not required.

Due to such a filtrated oil feeding system for the closed fluid circuit of the hydrostatic stepless transmission, the axle driving apparatus according to the present invention can be vertically compact because oil filter 17 is disposed at the outside (on the vertical side surface) of lower housing part 3. Accordingly, the vehicle provided with the apparatus can have a large ground clearance, thereby being prevented at the portion thereof including oil filter 17 from hitting against an obstacle on the ground. Also, since oil filter 17 serving as the external oil sump is attached onto the outer surface of supporter 33 just by screwing male screwed tube portion of oil discharge port 17c thereof into female screwed hole 34a, it can be easily attached and detached, thereby easing maintenance and exchange thereof. Furthermore, a commercially available oil filter can be used for oil filter 17, thereby reducing the cost of oil filtrating.

Also, the oil splitting system for feeding oil into the pair of oil passages 30a of center section 8 disposed in housing 1 is provided in supporter 33, which is independent to housing 1 (upper and lower housing parts 2 and 3) and center section 8, so that the maintenance of the system can be done by removing bolts 24 and pulling out supporter 33. Hence, the axle driving apparatus according to the present invention is advantageous in maintenance of the oil splitting system thereof and in requiring no cost of exchange of a housing or a center section even in the event of a trouble generated in the oil splitting system, in comparison with such an apparatus that the oil splitting portion is provided in a wall of a housing or a center section.

Figure 5:
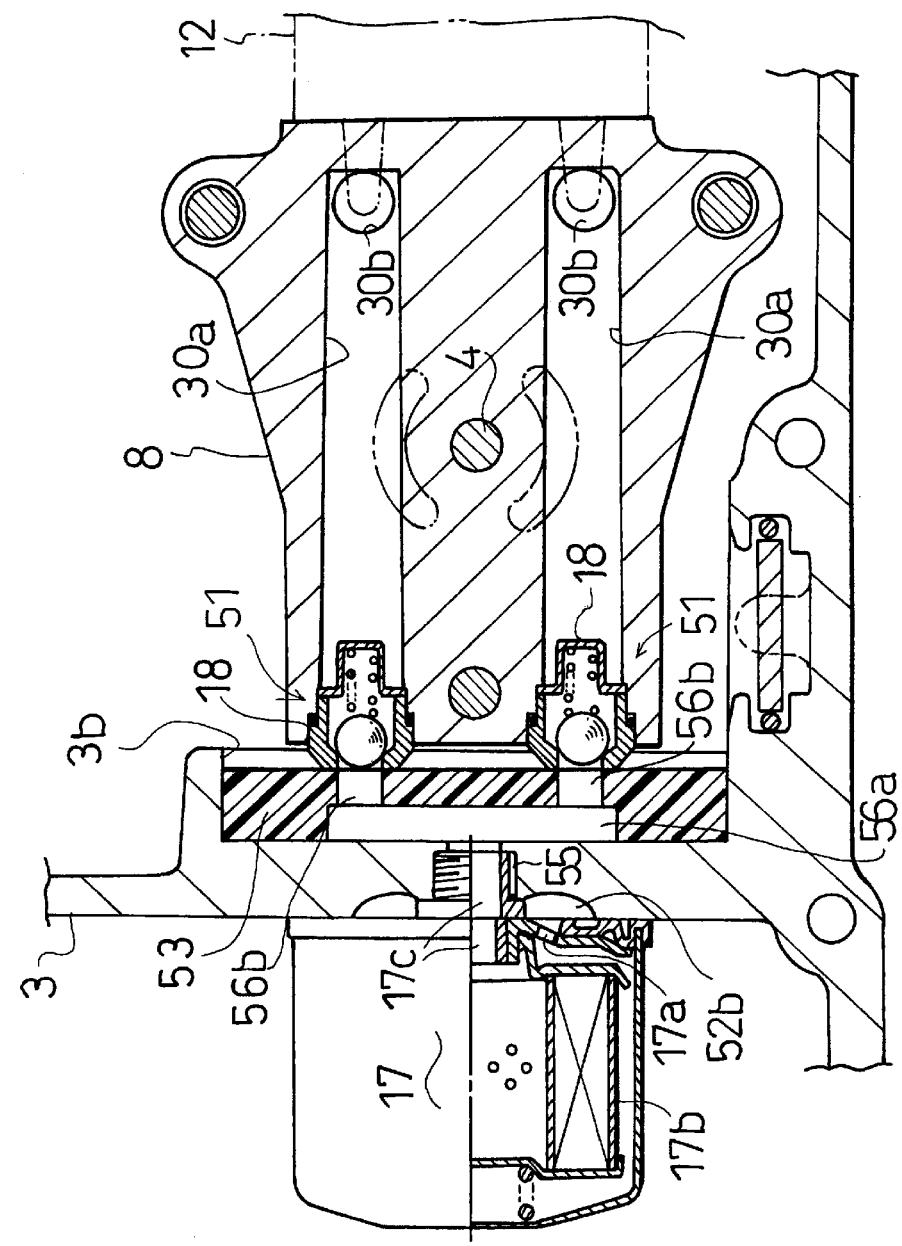
FIG. 5 is a fragmentary sectional plan view of the axle driving apparatus showing an area wherein an oil filter is disposed according to a second embodiment of the present invention.
Figure 6:
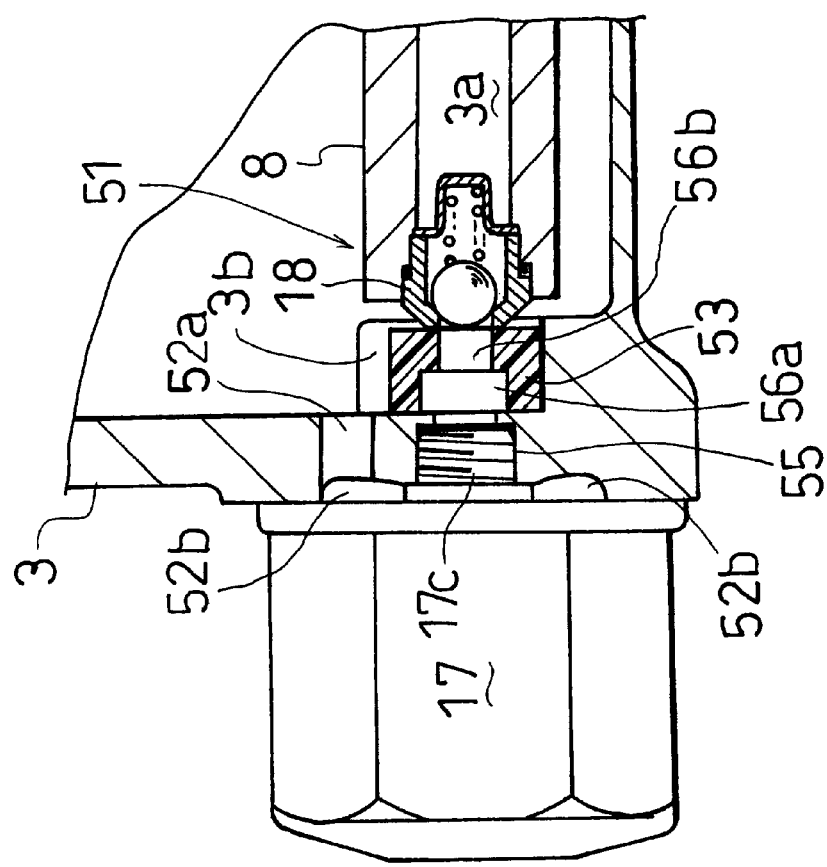
FIG. 6 is a sectional front view of the same.

Next, explanation will be given on a second embodiment of the present invention in accordance with FIGS. 5 and 6.

According to this embodiment, oil filter 17 is detachably attached directly to the outer side surface of lower housing part 3. Only lower housing part 3 constitutes the oil extracting means. Lower housing part 3 and an elastic member 53 made of rubber or the like, which is disposed between the inner side surface of lower housing part 3 and center section 8, constitute the oil introducing means. Elastic member 53 looking like a plate is recessed at one side thereof by an oil groove 56a and is bored there through between oil groove 56a and the other side thereof by a pair of split oil holes 56b. Oil groove 56a and the pair of split oil holes 56b constitute a second oil introducing passage 56.

Elastic member 53 is inserted into a recessed portion 3b formed at the inner side surface of lower housing part 3, so that oil groove 56a on the one side thereof faces the inner side surface of lower housing part 3 and the open ends of split oil holes 56b on the other side thereof face respective open ends of oil passages 30a of center section 8.

Check valves 18 are engaged into the respective open ends of oil passages 30a, so that they project outwardly from center section 8 so as to abut against the facing side surface of elastic member 53, whereby the inlets opening on the projecting portions of check valves 18 communicate with respective split oil holes 56b. Check valves 18 themselves constitute respective oil feeding ports 51 of this embodiment.

A female screwed hole (a first oil introducing passage) 55 for engaging with oil discharge port 17c of oil filter 17 there into is bored through the side portion of lower housing part 3 between the outer and inner side ends thereof, thereby communicating oil discharge port 17c with oil groove 56a. Hence, oil discharge port 17c engaged in female screwed hole 55 formed in lower housing part 3 is communicated with the pair of oil passages 30a of center section 8 through second oil introducing passage 56 formed in elastic member 53.

Lower housing part 3 is also provided with an oil extracting passage 52 for connect the internal oil sump in housing 1 and oil suction port 17a of oil filter 17. In this regard, a ring-like oil chamber 52b is recessed at the outer side surface of lower housing part 3 so as to surround female screwed hole 55 and an oil hole 52a is bored through the side portion of lower housing part 3 so as to communicate a portion of oil chamber 52b with the internal oil sump in housing 1. The interior of female screwed hole 55 is separated from oil chamber 52b by the male screwed tube portion of oil discharge port 17c engaged therein, thereby separating oil extracting passage 52 from first and second oil introducing passages 55 and 56.

This embodiment also enables oil filter 17 serving as the external oil sump to be easily attached and detached at the exterior of housing 1, thereby easing the maintenance or exchange thereof. Furthermore, just by disposing it at the outer side of housing 1, the axle driving apparatus can be vertically compact, so that, when a vehicle is provided with such an axle driving apparatus, it can have a large ground clearance and oil filter 17 on the apparatus can be prevented from hitting against an obstacle on the ground. A commercially available oil filter can be used for oil filter 17, thereby reducing the cost of oil filtrating.

Also, an oil split portion for dividing oil into the pair of oil feeding ports 51 is formed in elastic member 53, which is independent to housing 1 and center section 8, thereby simplifying the oil hole boring of housing 1 and center section 8 and reducing the manufacturing cost thereof. Moreover, elastic member 53 is simply formed by cheap material like rubber, thereby reducing the cost for exchange thereof, in comparison with supporter 33 of the former embodiment.

What is claimed is:

1. An axle driving apparatus comprising:
   a housing;
   a fluid circuit disposed in said housing, said fluid circuit fluidly connecting a hydraulic pump with a hydraulic motor, thereby constituting a hydrostatic stepless transmission;
   an internal fluid sump formed at an interior of said housing;
   an external fluid sump formed at an exterior of said housing, said external fluid sump provided with a fluid inlet port, a fluid outlet port and a filter element interposed between said fluid inlet port and said fluid outlet port;
   a fluid feeding port fluidly connected to said fluid circuit, wherein said fluid feeding port becomes open toward said fluid circuit when the fluid pressure within said fluid circuit becomes negative;
   a fluid extracting means communicating said internal fluid sump with said fluid inlet port of said external fluid sump; and
   a fluid introducing member communicating said fluid outlet port of said external fluid sump with said fluid feeding port.

2. The axle driving apparatus as set forth in claim 1, further comprising:
   a pair of fluid passages serving as said fluid circuit; and
   a pair of fluid feeding ports serving as said fluid feeding port, connected with said respective pair of fluid passages, wherein said fluid introducing member has a fluid passage which splits toward said pair of fluid feeding ports.

3. The axle driving apparatus as set forth in claim 1, wherein said external fluid sump is detachably attached onto said housing.

4. The axle driving apparatus as set forth in claim 3, further comprising:
   a pair of fluid passages serving as said fluid circuit; and
   a pair of fluid feeding ports serving as said fluid feeding port, connected with said respective pair of fluid passages, wherein said fluid introducing member has a fluid passage which splits toward said pair of fluid feeding ports.

5. An axle driving apparatus comprising:
   a housing;
   a fluid circuit disposed in said housing, said fluid circuit fluidly connecting a hydraulic pump with a hydraulic motor, thereby constituting a hydrostatic stepless transmission;
   an internal fluid sump formed at an interior of said housing;
   an external fluid sump formed on an outer surface of said housing, said external fluid sump provided with a fluid inlet port, a fluid outlet port and a filter element interposed between said fluid inlet port and said fluid outlet port;
   a fluid feeding port fluidly connected to said fluid circuit, wherein said fluid feeding port becomes open toward said fluid circuit when the fluid pressure within said fluid circuit becomes negative;
   a fluid extracting means communicating said internal fluid sump with said fluid inlet port of said external fluid sump; and
   a fluid introducing member communicating said fluid outlet port of said external fluid sump with said fluid feeding port.

6. The axle driving apparatus as set forth in claim 5, further comprising:
   a pair of fluid passages serving as said fluid circuit; and
   a pair of fluid feeding ports serving as said fluid feeding port, connected with said respective pair of fluid passages, wherein said fluid introducing member has a fluid passage which splits toward said pair of fluid feeding ports.

7. The axle driving apparatus as set forth in claim 5, wherein said external fluid sump is detachably attached onto said outer surface of said housing.

8. The axle driving apparatus as set forth in claim 7, further comprising:
   a pair of fluid passages serving as said fluid circuit; and
   a pair of fluid feeding ports serving as said fluid feeding port, connected with said respective pair of fluid passages, wherein said fluid introducing member has a fluid passage which splits toward said pair of fluid feeding ports.

9. The axle driving apparatus as set forth in claim 5, wherein said outer surface of said housing is constituted by one outer side surface of said housing.

10. The axle driving apparatus as set forth in claim 9, further comprising:
a pair of fluid passages serving as said fluid circuit; and
a pair of fluid feeding ports serving as said fluid feeding port, connected with said respective pair of fluid passages, wherein said fluid introducing member has a fluid passage which splits toward said pair of fluid feeding ports.

11. The axle driving apparatus as set forth in claim 9, wherein said external fluid sump is detachably attached onto said side surface of said housing.

12. The axle driving apparatus as set forth in claim 11, further comprising:
a pair of fluid passages serving as said fluid circuit; and
a pair of fluid feeding ports serving as said fluid feeding port, connected with said respective pair of fluid passages, wherein said fluid introducing member has a fluid passage which splits toward said pair of fluid feeding ports.

13. An axle driving apparatus comprising:
a housing;
a fluid circuit disposed in said housing, said fluid circuit fluidly connecting a hydraulic pump with a hydraulic motor, thereby constituting a hydrostatic stepless transmission;
an internal fluid sump formed at an interior of said housing; an outwardly opening hole of said housing communicating with said internal fluid sump;
a support member passing through said hole, an outer portion of said support member closing the outer opening end of said hole;
an external fluid sump disposed on an outer surface of said support member, said external fluid sump provided with a fluid inlet port, a fluid outlet port and a filter element interposed between said fluid inlet port and said fluid outlet port, and
a fluid feeding port disposed in said housing, wherein said fluid feeding port becomes open toward said fluid circuit when the fluid pressure within said fluid circuit becomes negative, and said support member is provided with a fluid extracting passage between said internal fluid sump and said fluid inlet port and with a fluid introducing passage between said fluid outlet port and said fluid feeding port.

14. The axle driving apparatus as set forth in claim 13, further comprising:
a pair of fluid passages serving as said fluid circuit, and
a pair of fluid feeding ports serving as said fluid feeding port, connected with said respective pair of fluid passages, wherein said fluid introducing passage splits toward said pair of fluid feeding ports.

15. The axle driving apparatus as set forth in claim 13, wherein said external fluid sump is detachably attached onto said outer surface of said support member.

16. The axle driving apparatus as set forth in claim 15, further comprising:
a pair of fluid passages serving as said fluid circuit, and a pair of fluid feeding ports serving as said fluid feeding port, connected with said respective pair of fluid passages, wherein said fluid introducing passage splits toward said pair of fluid feeding ports.

17. The axle driving apparatus as set forth in claim 13, wherein said outer surface of said support member is disposed on one outer side surface of said housing.

18. The axle driving apparatus as set forth in claim 17, further comprising:
a pair of fluid passages serving as said fluid circuit, and
a pair of fluid feeding ports serving as said fluid feeding port, connected with said respective pair of fluid passages, wherein said fluid introducing passage splits toward said pair of fluid feeding ports.

19. The axle driving apparatus as set forth in claim 17, wherein said external fluid sump is detachably attached onto said outer surface of said support member.

20. The axle driving apparatus as set forth in claim 19, further comprising:
a pair of fluid passages serving as said fluid circuit, and
a pair of fluid feeding ports serving as said fluid feeding port, connected with said respective pair of fluid passages, wherein said fluid introducing passage splits toward said pair of fluid feeding ports.

21. An axle driving apparatus comprising:
a housing;
a fluid circuit disposed in said housing, said fluid circuit fluidly connecting a hydraulic pump with a hydraulic motor, thereby constituting a hydrostatic stepless transmission;
an internal fluid sump formed at the interior of said housing;
an external fluid sump disposed on the outer surface of said housing, said external fluid sump provided with a fluid inlet port, a fluid outlet port and a filter element interposed between said fluid inlet port and said fluid outlet port, wherein said housing forms a fluid extracting passage between said internal fluid sump and said fluid inlet port of said external fluid sump and forms a first fluid introducing passage in communication with said fluid outlet port of said external fluid sump;
a fluid feeding port fluidly connected to said fluid circuit, wherein said fluid feeding port becomes open toward said fluid circuit when the fluid pressure within said fluid circuit becomes negative; and
a fluid introducing member forming a second fluid introducing passage, wherein said fluid introducing member is interposed between the inner surface of said housing and said fluid feeding port, thereby connecting said first fluid introducing passage with said fluid feeding port through said second fluid introducing passage of said fluid introducing member.

22. The axle driving apparatus as set forth in claim 21, further comprising:
a pair of fluid passages serving as said fluid circuit; and
a pair of fluid feeding ports serving as said fluid feeding port, connected with said respective pair of fluid passages, wherein said fluid introducing member splits toward said pair of fluid feeding ports.

23. The axle driving apparatus as set forth in claim 21, wherein said external fluid sump is detachably attached onto said outer surface of said housing.

24. The axle driving apparatus as set forth in claim 23, further comprising:
a pair of fluid passages serving as said fluid circuit; and
a pair of fluid feeding ports serving as said fluid feeding port, connected with said respective pair of fluid passages, wherein said fluid introducing member splits toward said pair of fluid feeding ports.

25. The axle driving apparatus as set forth in claim 21, wherein said outer surface of said housing is constituted by one outer side surface of said housing.

26. The axle driving apparatus as set forth in claim 25, further comprising:

a pair of fluid passages serving as said fluid circuit; and a pair of fluid feeding ports serving as said fluid feeding port, connected with said respective pair of fluid passages, wherein said fluid introducing member splits toward said pair of fluid feeding ports.

27. The axle driving apparatus as set forth in claim 25, wherein said external fluid sump is detachably attached onto said side surface of said housing.

28. The axle driving apparatus as set forth in claim 27, further comprising:

a pair of fluid passages serving as said fluid circuit; and a pair of fluid feeding ports serving as said fluid feeding port, connected with said respective pair of fluid passages, wherein said fluid introducing member splits toward said pair of fluid feeding ports.

29. The axle driving apparatus as set forth in claim 21, wherein said fluid introducing member is formed of an elastic material.

30. The axle driving apparatus as set forth in claim 22, wherein said fluid introducing member is formed of an elastic material.

\* \* \* \* \*